United States Patent [19]
Lee et al.

[11] 3,709,042
[45] Jan. 9, 1973

[54] CAPACITANCE ACCELEROMETER

[76] Inventors: Shih-Ying Lee; Yao Tzu Li, both of Huckleberry Hill, South Lincoln, Mass. 01773

[22] Filed: May 14, 1969

[21] Appl. No.: 824,566

[52] U.S. Cl. .................................................73/516 R
[51] Int. Cl. ..............................................G01p 15/02
[58] Field of Search................73/71.2, 515, 516, 517

[56] References Cited

UNITED STATES PATENTS

| | | | |
|---|---|---|---|
| 2,909,364 | 10/1959 | Stedman | 73/516 |
| 3,020,767 | 2/1962 | Kisteer | 73/497 |
| 3,089,343 | 5/1963 | Rule | 73/517 |
| 3,151,486 | 10/1964 | Plummer | 73/517 |
| 3,240,073 | 3/1966 | Pitzer | 73/517 |
| 3,267,740 | 8/1966 | Stedman | 73/516 |
| 3,292,059 | 12/1966 | Woods | 73/517 |
| 3,323,372 | 6/1967 | Kistler et al. | 73/517 |
| 3,132,521 | 5/1964 | Zrupick et al. | 73/517 |
| 3,176,521 | 4/1965 | Clark | 73/517 |
| 3,339,419 | 9/1967 | Wilcox | 73/517 |

*Primary Examiner*—Richard C. Queisser
*Assistant Examiner*—Herbert Goldstein
*Attorney*—Kenway, Jenney & Hildreth

[57] ABSTRACT

The mass of a seismic suspension serves as the center plate of a balanced differential capacitor suitable for use in an open loop accelerometer system. The flexures constrain the seismic mass to motion in one direction. The trapped gas between the plates of the differential capacitor provides squeezed film damping. The differential capacitor modulates circuitry such as a differential pulse width modulation system to provide a high-level output.

12 Claims, 15 Drawing Figures

INVENTORS
SHIH-YING LEE
YAO TZU LI

INVENTORS
SHIH-YING LEE
YAO TZU LI

PATENTED JAN 9 1973 3,709,042

INVENTORS
SHIH-YING LEE
YAO TZU LI

BY

Kenway, Jenney & Hildreth
ATTORNEYS

CAPACITANCE ACCELEROMETER

There are many existing accelerometers; most of them based upon a strain gauge or variable reluctance transducer coupled to a seismic mass. These gauges may have relatively poor dynamic response for the latter case and be severely damaged or destroyed by extreme overloads for the former. Damping is usually provided by a viscous liquid contained between parts having relative shearing motion. Accordingly damping characteristics vary significantly when extreme variations in ambient temperature are encountered because the viscosity of most liquids is a strong function of temperature.

Variable capacitances have not been used successfully as the pickup for, or as the transducer for, an accelerometer system. The capacitance is normally transmitted through a cable to external electronic measuring means. The capacitance of the conductors of the cable are often of the same order of magnitude of the acceleration dependent capacitance. Thus the variation in the capacitance of the cable and other coupled capacitances results in poor accuracy.

Accordingly it is an object of the present invention to provide an improved accelerometer with high dynamic response and an extremely high tolerance of overload accelerations.

Another object is to provide an improved accelerometer with damping characteristics which have a minimum of dependence upon the ambient temperature. A further object is to provide an improved accelerometer adapted to unitary fabrication as a small compact structure with integral electronics and high-level direct current output which is insensitive to variation of cable capacitance.

These and other objects are achieved through the utilization of the seismic mass as the center plate in a differential capacitor which serves as the modulating element in an open loop pulse width modulating electronic or other suitable system.

The invention is further described in the following description in conjunction with the following drawings wherein.

Figure 1:
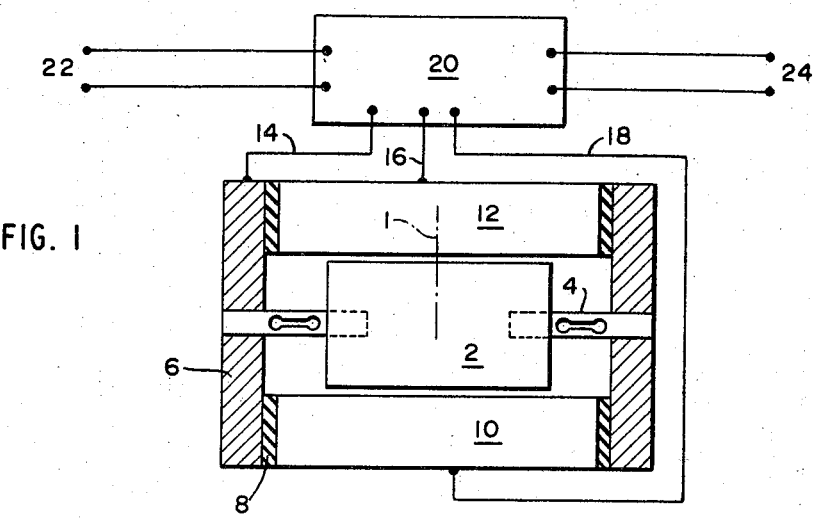
FIG. 1 is a schematic cross-section of the accelerometer system.

Referring now to FIG. 1, the seismic mass 2 is suspended on flexures 4 from a housing 6. Insulating separators 8 connect capacitor plates 10 and 12 to the housing. The seismic mass 2 serves as the center mass of a differential capacitor. The seismic mass 2 is electrically connected to the housing 6 through the conductive suspension flexures 4. Leads 14, 16 and 18 connect the seismic mass and capacitor plates to input terminals of the electronic detection circuitry 20. Input excitation is supplied to the electronic circuitry through terminals 22, and the output is provided at terminals 24.

If the electronic circuitry 20 is that of our copending application Ser. No. 681,371, now U.S. Pat. No. 3,518,536 directed to a differential pulse width modulation system, the output will appear as a direct current output at terminals 24 and direct current excitation may be employed at input terminals 22. While applicants' pulse width modulation system is the preferred system for use with the transducer of the present invention, any system capable of supplying an output in response to predetermined variations in the capacitances of a differential capacitor may be employed.

Figure 12:
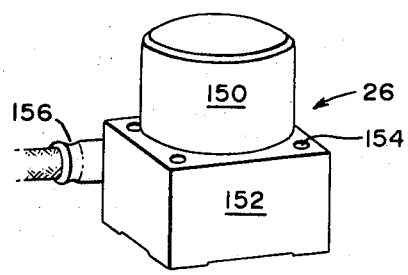
FIG. 12 is a perspective view of the housing shell of a complete accelerometer assembly.

As shown in the perspective view of the entire accelerometer assembly of FIG. 12, the preferred electronics may be assembled within the housing shell 26 containing the seismic differential capacitor, so that the leads 14, 16 and 18 are extremely short. Therefore, stray capacitance which might otherwise degrade the performance or sensitivity of the sensing transducer is reduced to a minimum. The electronic system 20 provides a high-level output so that the leads transferring the output 24 to utilization apparatus will have only a minimal effect upon the output signal. Typically the accelerometer apparatus of this invention delivers approximately one hundred times the output signal voltage and ten thousand times the output power of an accelerometer employing a strain gauge transducer. Thus by comparison, noise and power frequency pickup problems are virtually non-existent with the present invention. The power output levels can be sufficient to power a control device or relay without amplification. If merely a read-out indication is desired, anything from a voltmeter to an oscilloscope may be used. Special cable with matching capacitance is not required for transmission of the output signal to remote locations.

Figure 2:
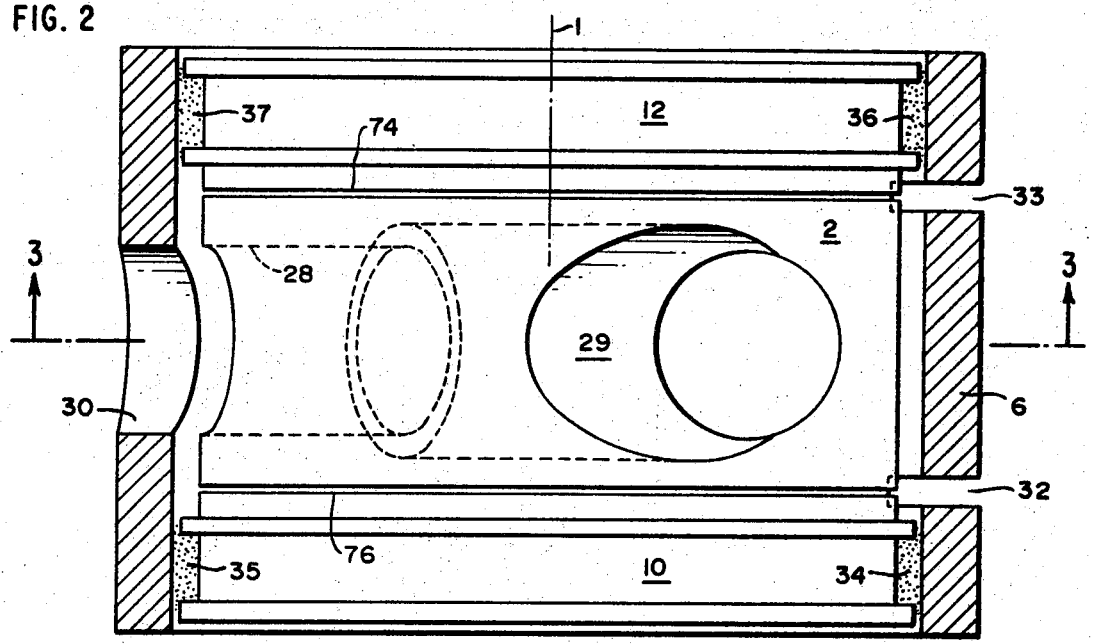
FIG. 2 is a partial cross-section of a differential capacitor assembly incorporating the seismic system.

Referring now to FIG. 2, a preferred mechanical construction is shown with the housing frame 6 sectioned, and the flexure elements 4 omitted. In the actual seismic transducer the flexure elements 4 would have been fixed in place before the outside capacitor plates 10 and 12 were added to the seismic mass.

In the preferred embodiment three flexure elements 4 are utilized. In the view of FIG. 2 the mounting holes 28 and 29 in the seismic mass 2 for two of these elements are shown along with the corresponding sectioned hole 30 in the housing 6 for the element which extends into hole 28. To provide the proper spacing of the capacitor plates 10 and 12, shims are inserted through slots 32 and 33 in the housing 6. The view of FIG. 2 shows only two of these slots but there are two additional pairs of slots spaced equally about the periphery of the housing or frame 6. With the plates 10 and 12 properly spaced from the seismic mass 2 a suitable insulating bonding material such as an epoxy cement is utilized to fill the spaces 34, 35 and 36, 37 around the perimeter of the plates 10 and 12. After the epoxy has set, the spacing shims are removed from the slots 32 and 33.

The fixed support of capacitor plates 10 and 12 close to the seismic mass 2 provides a positive overload protection for the acceleration transducer. If, for example, an overload acceleration is applied in the downward direction as the device is oriented on the drawing of FIG. 2, the seismic mass 2 will be deflected to a position in contact with the capacitor plate 12. The flexure elements 4 will be unable to restrain the seismic mass in this overload condition but will not be deformed because only a minimal displacement of the seismic mass 2 occurs before it is restrained by the positive stop provided by capacitor plate 12. A similar situation occurs for overloads in the opposite direction, the restraint being provided by capacitor plate 10 in that case.

Figure 4:
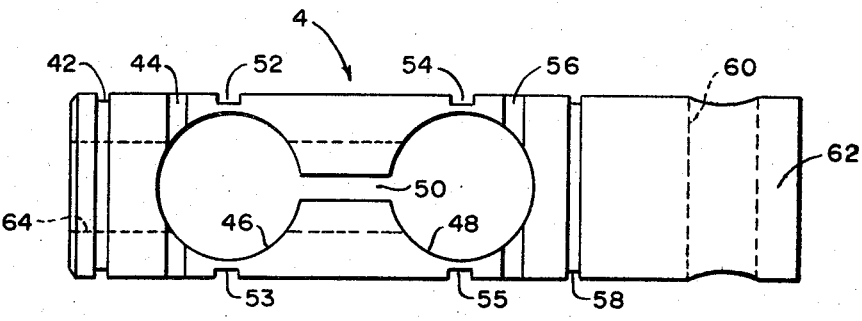
FIG. 4 is an elevation view of a suspension element.
Figure 5:
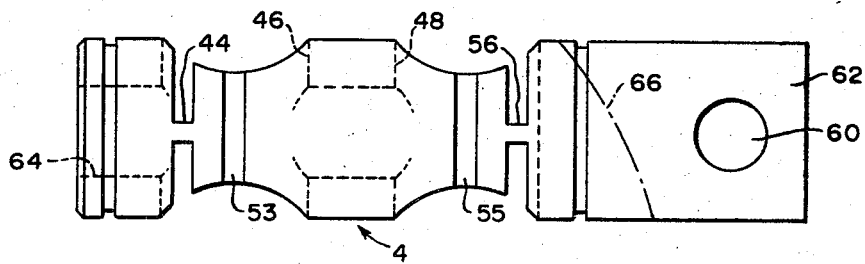
FIG. 5 is a plan view of a suspension element.
Figure 3:
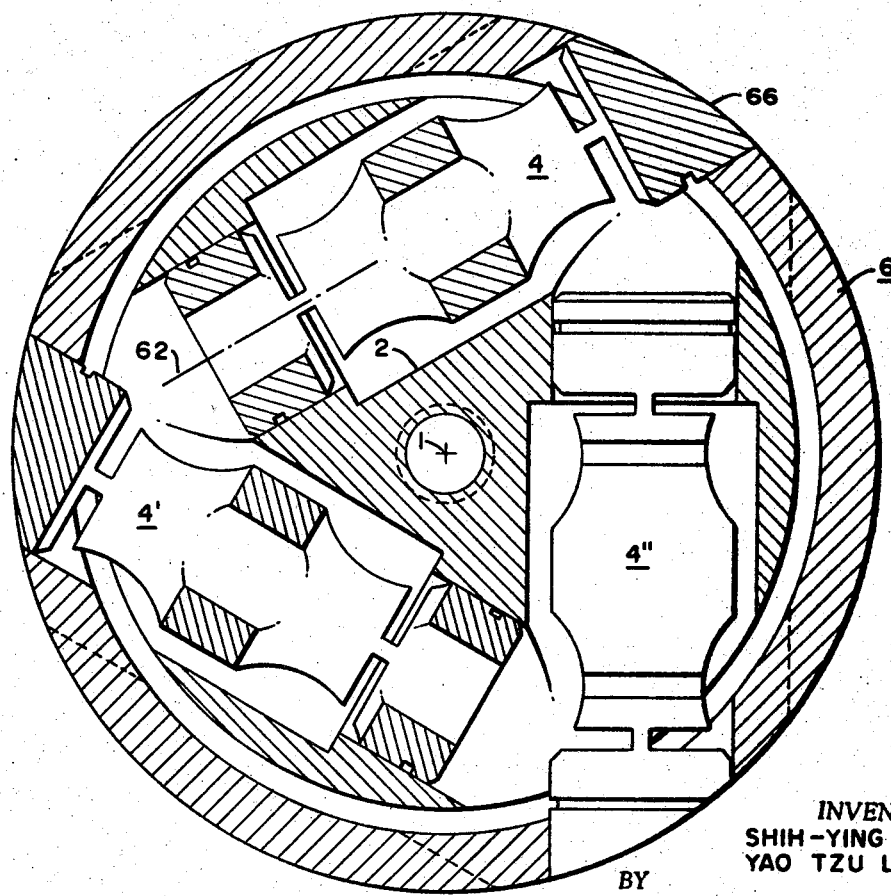
FIG. 3 is a cross-section plan view through the embodiment of FIG. 2 showing seismic mass, suspension elements and frame.

The flexure elements 4 are shown in elevation and plan view in FIGS. 4 and 5 respectively and their orientation with respect to the seismic mass 2 are shown in FIG. 3. As shown in FIGS. 4 and 5, the inner end of the flexure element 4 has an annular ring 42 at the inner end as finally positioned. This ring has no function in the operation as a flexure or support for the seismic mass but provides a place for bonding material such as solder before it is melted and bonds 4 to 6. Normally stainless steel will be used for the material in flexure 4, and it will be brazed or soldered in place into the seismic mass 2.

Further along the flexure, a reduced section 44 is provided. The long dimension of this thin web is in the direction of accelerations to which the device is sensitive. Typically the thickness of this web may be approximately ten thousandths of an inch for devices useful in the range of accelerations having a magnitude 1 to 5 times that of gravity and twenty thousandths of an inch for higher accelerations. The function of these webs is to allow a slight rotational motion. With three flexures 4 arranged as shown in FIG. 3 displacement of the inertial mass along its central axis produces the slight rotational motion which is accommodated by the reduced sections 44.

Two large circular sections 46 and 48 are removed from the flexure stock and connected by a slot 50. At the thin sections produced by the circular cuts 46 and 48, grooves 52, 53, 54 and 55 are cut. The depth of these grooves will determine the spring rate of the flexure assembly. A thin web 56, similar to the web 44 described above, completes the operative portion of the flexure 4. A hole 64 is bored lengthwise through the operative portions of the flexure to provide the proper dimensions and make the operative portions sections of a cylindrical shell. An annular groove 58, similar in function to the groove 42, is provided to aid in the affixing of the flexure within the housing 6. A hole 60 bored at right angles to the longitudinal axis 62 of the flexure is utilized in positioning the flexure during fabrication and assembly.

The completed flexure operates as a parallelogram bending primarily at the reduced sections provided by the cuts 52, 53, 54 and 55. As shown in FIG. 3, when the flexure 4 is assembled within the frame 6 and has been affixed in place by soldering or by other suitable means, the excess outside end of the flexure is cut or ground off to provide a surface 66 which is smooth and continuous with the external surface of the frame 6. The longitudinal axes 62 of the flexures are at 60° with respect to each other so that the axes as extended form an equilateral triangle. The resulting structure is quite rigid with respect to forces tending to displace the inertial mass 2 in a direction transverse to the axis of sensitivity 1 of the device.

Figure 6:
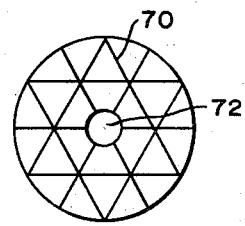
FIG. 6 is a plan view of an end capacitor plate for low acceleration applications.
Figure 7:
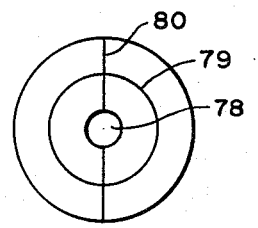
FIG. 7 is a plan view of an end capacitor plate for medium acceleration configurations.
Figure 8:
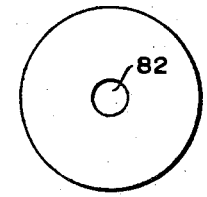
FIG. 8 is an end capacitor plate for high acceleration configurations.

FIGS. 6, 7 and 8 show in plan view the surfaces of end capacitor plates for low, medium and high acceleration applications respectively.

Referring now to FIG. 6, a large number of angled grooves 70 are shown connecting with center hole 72. This large number of grooves is suitable, for example, in an accelerometer according to the present invention to be utilized in applications where full scale deflection is to be produced by an acceleration equal to the acceleration of gravity. The separation between the seismic mass 2 and the capacitor plates 10 and 12 forming the remainder of the differential capacitor is quite small, typically in the order of 0.0005 in. For ease of manufacturing control, the spacing is not dependent upon the acceleration range for which the accelerometer is designed. Other parameters such as the flexure stiffness and magnitude of the seismic mass determine the displacement produced by a given acceleration and are adjusted so that the displacement produced by a full scale acceleration is less than the spacing between the seismic mass and the adjacent capacitor plate. This space is filled with gas, normally ordinary air but special gases at specified pressure may be utilized. The differential capacitor of this invention can be easily constructed to provide a sealed enclosure by filling all openings in the frame 6 and capacitor plates 10 and 12. Alternatively, the entire outer housing shell 26 shown in FIG. 12 may be sealed.

If the acceleration being measured is being applied in a downward direction with the apparatus as shown sectioned in FIG. 2, the seismic mass 2 will be deflected toward the plate 12. Squeeze film damping is provided by the gas momentarily trapped between the mass 2 and the plate 12. To control the rate at which this gas escapes to the space between the mass 2 and the housing 6 and into the now larger space between the mass 2 and the other plate 10, the grooves 70 and 72 shown in FIG. 6 are provided on the lower face 74 of capacitor plate 12 and the upper face 76 of capacitor plate 10. Normally the desired damping will be about 0.7 of critical damping at ambient design temperature.

The damping provided by the gaseous films is far more independent of temperature than the damping provided by the normal viscous liquid. Typically it will change about 15 percent per 100°F. for air. Since the spring constant of the flexures 4 is but little affected by a wide variation in temperature, the relationship between the change in differential capacitance and the applied acceleration force varies very little over an extremely large temperature range.

For medium acceleration forces the stiffness of the flexure elements 4 will be greater. For ease of manufacturing control, the mass is substantially constant for all ranges. The damping should be increased to achieve the approximate 0.7 of critical damping coefficient which is preferred for the apparatus of this invention. As shown in FIG. 7, the inner surfaces of plates 10 and 12 may have relatively few grooves, so that the gas will not be squeezed out easily —for example, the circular groove 79 and a single, straight groove 80. These grooves and hole 78 provide the desired damping. For higher acceleration applications there may be no groove at all as shown in FIG. 8, the damping being controlled by hole 82.

Figure 9:
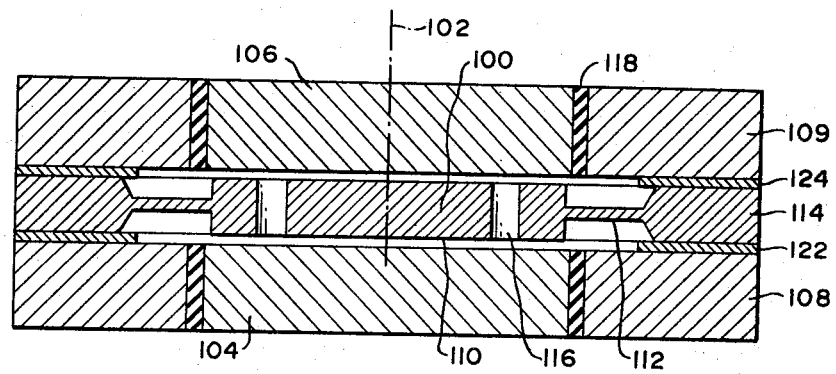
FIG. 9 is an elevation cross-section view of a differential capacitor assembly for higher acceleration conditions.

For applications with very high accelerations to be measured it is desirable to provide a structure with higher spring stiffness and lower seismic mass. For such applications the embodiment of FIG. 9 is suitable. This structure has a seismic mass 100 adapted to measure accelerations along a central axis 102. The mass 100 forms the central plate of a differential capacitor having end plates 104 and 106. Although the seismic and suspension arrangements differ from that of the apparatus shown in FIGS. 2 and 3, the function of the seismic mass and differential capacitor formed by the seismic mass and end capacitor plates is identical.

In the apparatus of FIG. 9, the seismic mass 100 has a central portion 110 of maximum thickness. Surrounding this central portion, there is a thinner section 112 shown in cross-section in FIG. 9 and in plan view in FIG. 10. The perimeter of the section of which the seismic mass is fabricated is a section 114 of maximum thickness. Holes 116 are provided to permit passage of gas from one side to the other of the seismic mass as the mass is deflected during the measurement of acceleration forces. The hole having an effective cross-section substantially larger than the effective cross-section provided by the spacing between the facing pairs of the surface through which the film of gas is squeezed. The larger cross-section providing substantially lower resistance to the passage of gas than the resistance presented by the path between facing pairs of surfaces.

The three sections of the structure of FIG. 9 are prepared independently and then assembled. The end capacitor plates 104 and 106 are cemented to their corresponding outer rings 108 and 109 with a suitable insulating cement. The end sections containing the capacitor plates are then finished lapped to provide flat surfaces. Two ring-shaped shims 122 and 124 of appropriate thickness are sandwiched between the end plate assemblies and the outer portion 114 of the central plate.

Figure 10:
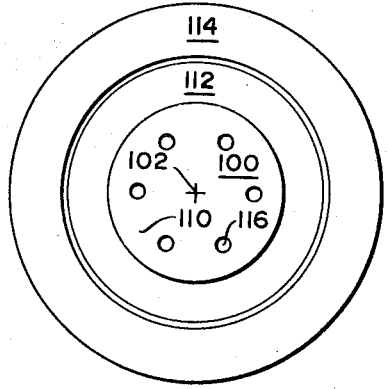
FIG. 10 is a plan view of the seismic center plate for the apparatus of FIG. 9.

Since the embodiment of FIG. 9 and 10 is to be used in very high g. applications, the proper squeeze film damping will be provided with a minimum amount of grooving on the inner faces of capacitor plates 104 and 106. Typically a small number of grooves or a groove in alignment with the circle upon which the holes 116 are spaced is all that will need to be provided.

As set forth in the above description, the seismic mass 100 of the apparatus of FIG. 9 is formed of a unitary element which serves as the mass 100, as the suspension 112 and as the center element of the differential capacitor. Thus a simple rugged construction is provided. Since the diaphragm can be very light in weight, it can respond to accelerations varying very rapidly and effective damping can be achieved even at very high frequencies.

Figure 11:
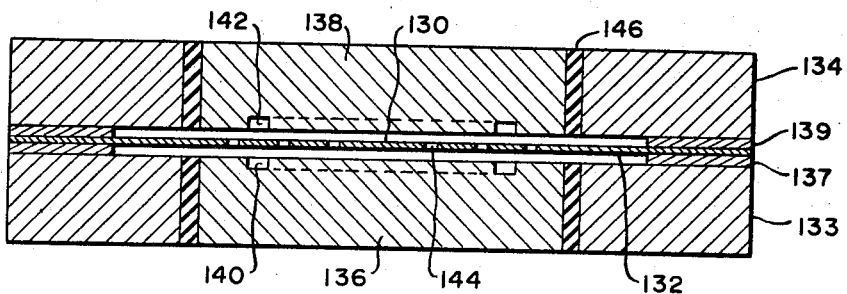
FIG. 11 is an elevation cross-section view of a seismic differential capacitor assembly employing a stretched diaphragm for extremely high accelerations.

For still higher acceleration applications, the seismic mass is provided by a tightly stretched diaphragm as shown in FIG. 11. Here the inertial mass 130 is provided by a diaphragm or membrane 132 stretched tightly within the housing or frame 134. The outside capacitor plates of the differential capacitor of the accelerometer are formed by lower and upper plates 136 and 138. These plates have grooves 140 and 142 respectively formed in their inner surfaces. These grooves and the holes 144 in the seismic mass 132 provide the proper squeeze damping as the contained gas is forced from one side to the other of diaphragm 132 as the apparatus responds to acceleration forces. As with the arrangement of FIG. 9, epoxy or other cement is used in the spaces 146 to fix the end plates of the differential capacitor in position and insulate these plates from the outer ring sections 133 and 135 which form the housing and thus from the inertial mass 130. Circular shims 137 and 139 of proper thickness are used to obtain proper gap between the seismic mass and the end plates.

To fabricate the apparatus of FIG. 11, the two sections 133 and 135 of the housing 134 and shims 137 and 139 may be clamped to the diaphragm 132 when it is in a tightly stretched condition. For example, a somewhat larger section of the diaphragm material may be stretched in apparatus similar to an embroidery hoop and the sections 133 and 135 tightly clamped to the stretched diaphragm 132. The assembly can be held in place by bolts or may be soldered, welded or retained by any standard mechanical means. Typically the apparatus of FIG. 11 would have a diaphragm approximately 0.0005 in. thick and be operable to measure accelerations in the range corresponding to 10,000 g.

In the apparatus of FIG. 11 the diaphragm 132 not only serves as the seismic mass 130 but also serves as the spring restraint and center element for the differential capacitor. Thus a very simple and rugged construction is obtained. Since the diaphragm is very light in weight, effective response and effective damping can be achieved even at very high frequencies. The apparatus is useful to measure accelerations occurring at up to 20,000 hertz. This same structure may be used for measuring accelerations of lesser magnitude if the diaphragm 132 is not tightly stretched.

Figure 13:
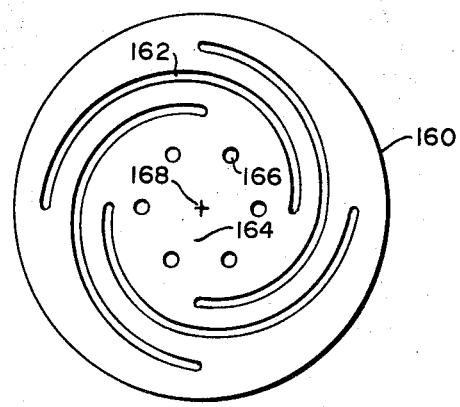
FIG. 13 is a plan view of another seismic center plate suitable for use in an accelerometer for medium acceleration conditions.

The central plate of another embodiment suitable for medium acceleration applications is shown in FIG. 13. This plate is analogous to FIG. 10 except for the fact that the spring restraint or flexure section is provided by spiral slots or perforations 162 rather than the reduced section 112 of the embodiment of FIG. 10. The central portion 164 provides the seismic mass and two innermost surfaces of the differential capacitor. Holes 166 give the predetermined damping as the plate moves along axis 168 perpendicular to its major surfaces. The plate 160 of FIG. 13 is assembled in a manner exactly like that described in connection with the embodiment of FIG. 9 and the resulting cross-section is identical, except that plate 160 replaces the central plate providing the mass 100 of FIG. 9.

Figure 14:
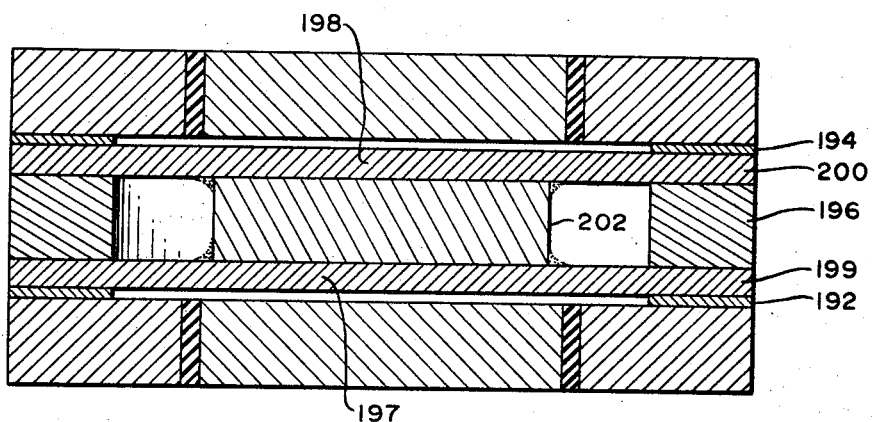
FIG. 14 is an elevation cross-section view of a differential capacitor assembly incorporating two plates as shown in FIG. 11 or FIG. 13 in conjunction with an additional supported seismic mass portion.

FIG. 14 shows an elevation cross-section view of a differential capacitor suitable for low or medium accelerations and employing two plates as shown in FIG. 11 or in FIG. 13. The method of preparation of the end sections is identical to that described in connection with FIG. 9. Thereafter, two circular shims 192 and 194 are used to space two plates 199 and 200 configured as shown in FIG. 13. To simplify the drawing the lines indicating the spiral slots and holes are not shown in this view. A spacer ring 196 separates the two plates 199 and 200 by a distance equaling the thickness of a central mass section 202. The central mass section 202 is affixed to the central portions 197 and 198 of the plates by any suitable means such as brazing, soldering or welding. If holes 156 are provided to adjust the damping, these holes penetrate both the plate sections 197 and 198 and the corresponding portion of mass 202. In the embodiment of FIG. 14 the seismic mass is provided by the sum of the inner portions 197 and 198 of the plates and the suspended mass 202. The spring function is provided by the section of plates 199 and 200 perforated by the spirals 162. The two plates constrain the central mass section to motion perpendicular to the faces of the plates.

Figure 15:
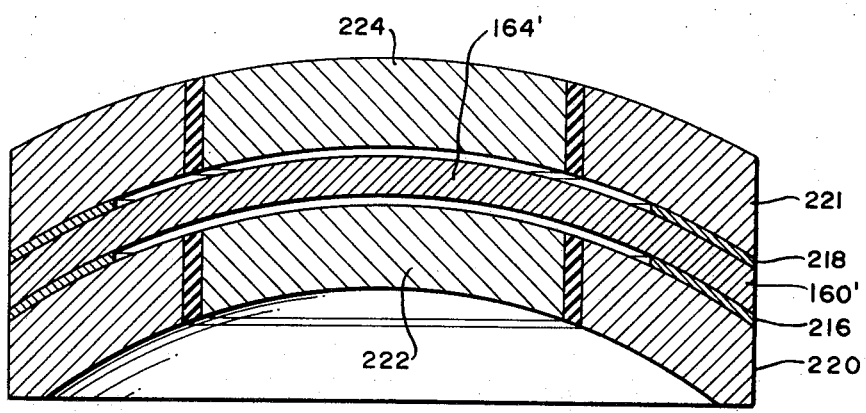
FIG. 15 is an elevation cross-section view of a differential capacitor assembly incorporating a center plate according to FIG. 13 in a spherical configuration.

FIG. 15 shows an elevation cross-section view of an embodiment suitable for use with the plates of FIGS. 10 or 13. This embodiment is similar to that of FIG. 9 except that the differential capacitor is formed in a domed or spherical configuration rather than the planar configuration of FIG. 9. A central plate 160' having a center section 164' which provides the seismic mass is spaced by shims 216 and 218 from the outer ring sections 212 and 214 of end plates 220 and 221. The differential capacitor action is provided by the motion of the seismic mass section 164 with respect to capacitor plates 222 and 224. While the embodiment of FIG. 15 has been described with a plate of FIG. 13, the plate of FIG. 10 or other suitable configurations could be used. The domed geometry provides maximum rigidity for minimum mass, thus extending the useful acceleration range for this type of construction. Particularly with respect to devices for high acceleration measurement, the thickness of the central plate is exaggerated in the drawing.

A typical over-all appearance of the completed accelerometer is shown in FIG. 12. This design could be used with all the capacitor transducer embodiments described herein. The outer housing shell 26 has an upper section 150 which contains the differential capacitor transducer and a lower section 152 which contains the electronic system 20 and provides mounting holes 154 for attaching the transducer to the structure whose accelerations are to be measured. All of the low-level, sensitive components are contained within the housing shell 26 so that a compact self-sufficient device is provided. A lead 156 carries the output signal to the utilization device being employed. As noted earlier, the output is a signal of considerable power so that special precautions do not need to be taken with the output lead 156 or the input of the apparatus to which it is connected. The lead assembly 156 also contains the leads supplying d.c. power to energize the electronic circuitry 20.

In all of the above embodiments, mass and damping of the differential capacitor are adjusted in relationship to the flexure stiffness and gap between plates to provide the desired performance with respect to frequency and acceleration ranges. The above embodiments can now be used to illustrate some of the criteria and ranges involved. The damping requirements are considered first. For low range accelerations there is generally excessive damping due to the squeezing action of the gas film. This excessive damping can be reduced by providing channels or holes to allow the gas to go in and out easier. For higher range accelerations there is usually not enough relative damping (or damping ratio). As is well known in the art, the critical damping is equal to twice the square root of the product of mass and spring rate. For a given seismic mass, higher spring rate must be used for a higher acceleration range unit. This results in high critical damping and higher absolute damping required to achieve the desirable damping ratio of 0.7. To complicate the matter, the high range acceleration unit generally has higher frequency band of applied accelerations. Operating at a high frequency region the compressibility effect of the gas becomes important. At these frequencies the gas will not have sufficient time to be squeezed out. It will simply be compressed. Thus the gas will act like an additional spring rather than an energy absorbing device.

To remedy this situation an extremely light mass must be used for a very high range acceleration unit. The light mass will require lower absolute damping to achieve a given damping ratio. This relatively low damping requirement can be fulfilled with a squeeze film having sufficiently short flow paths (provided by using a sufficient number of grooves and holes) so that the compressibility effect will not cause a degradation of the damping action.

A preferred means of reducing the mass for a high range unit is to use a thin central section or, for highest acceleration ranges, a tightly stretched thin membrane which has very high stiffness to mass ratio. In some cases it may be desirable to use a diaphragm shaped in a spherical, conical or other non-planar configuration to gain high structural rigidity for minimum mass.

When low spring restraint is desired, flexures such as those described in conjunction with FIGS. 4 and 5 provide a soft spring effect in the direction of the acceleration to be measured but high restraint to displacement in directions other than that of the desired rectilinear motion.

The embodiments employing a central disc or stretched diaphragm also offer extreme simplicity in assembly along with a high degree of resistance and insensitivity to accelerations other than those along the axis of design response.

While the above embodiments have been described for measurements of rectilinear accelerations along a predetermined axis, they are suitable, if properly mounted, for measurement of any single degree of motion acceleration. Thus they can be utilized in a manner analogous to prior single degree of motion accelerometers with a pendulous suspension system to measure linear acceleration for applications in which torsional acceleration is negligible, or with a balanced torsional suspension system to measure torsional acceleration.

Having thus described our invention, we claim:

1. A unitary accelerometer for measurement of acceleration along a predetermined section comprising
   a seismic mass,
   said seismic mass being made of a flexible member,
   said seismic mass being bent to a domed configuration,
   said domed seismic mass having two major surfaces,
   a capacitor plate adjacent each of said surfaces,
   flexure means providing a predetermined spring resistance to motion of said seismic mass along said predetermined direction,
   said flexure means having substantially higher spring resistance to displacement in other directions,
   said seismic mass and capacitor plates serving to provide a differential capacitor,
   whereby the changes in the capacitance of said differential capacitor are a function of the displacement of the seismic mass.

2. A unitary accelerometer for measurement of acceleration along a predetermined direction comprising
   a seismic mass,
   said seismic mass having two major planar surfaces,
   a capacitor plate adjacent each of said surfaces,
   flexure means providing a predetermined spring resistance to motion of said seismic mass along said predetermined direction,
   said flexure means constraining motion of said seismic mass along a predetermined direction with respect to a casing,
   said flexure means comprising,
   an element having a longitudinal axis,
   said element having at least two regions of substantially lower stiffness spaced along said axis,
   each of said regions of reduced stiffness comprising two portions of reduced cross-section,
   said portions of reduced cross-section lying on opposite sides of the longitudinal axis of said element,
   whereby said flexure means serves as a linkage with four pivot points,
   one end of said element being connected to said casing,
   and the other end of said element being connected to said seismic mass.

3. Apparatus according to claim 2 employing at least three of said elements,
   each of said elements having one end attached to said casing and the other end attached to said seismic mass,
   whereby said elements provide rectilinear motion of said seismic mass with respect to said casing.

4. A unitary accelerometer for measurement of acceleration along a predetermined direction comprising
   a seismic mass,
   said seismic mass having two major surfaces,
   a capacitor plate adjacent each of said surfaces,
   flexure means providing a predetermined spring resistance to motion of said seismic mass along said predetermined direction,
   said flexure means having substantially higher spring resistance to displacement in other directions,
   said seismic mass and capacitor plates serving to provide a differential capacitor,
   whereby changes in the capacitances of said differential capacitor are a function of the displacement of the seismic mass,
   and electronic measurement system,
   said differential capacitor serving to control the output of said electronic system,
   whereby the output of said system is linearly proportional to the displacement of said seismic mass,
   said differential capacitor having four surfaces,
   said surfaces being arranged in facing pairs,
   and the space between said seismic mass in the capacitor plates being filled with gas,
   the resulting film of gas between facing pairs of the surfaces serving to provide a predetermined damping ratio as the film of gas is squeezed between the seismic mass and the capacitor plate which it approaches when an acceleration force is applied to the transducer,
   at least one of said surfaces being provided with grooves,
   said grooves serving to provide a predetermined damping ratio as the film of gas is squeezed between the seismic mass and the capacitor plate.

5. A unitary accelerometer for measurement of acceleration along a predetermined direction comprising
   a seismic mass,
   said seismic mass having two major surfaces,
   a stationary capacitor plate adjacent each of said surfaces,
   said seismic and stationary capacitor plates serving to provide a differential capacitor,
   said seismic mass being formed as a central portion of a disc of material,
   said central portion being surrounded by an area containing perforations,
   said perforations being formed in the shape of slots producing a reduction in stiffness,
   whereby said area containing perforations serves to provide supporting flexure means for said seismic mass,
   said disc of material having two major planar surfaces,
   said major surfaces being parallel and equidistant throughout the entire area of the disc,
   and each of said capacitor plates having a planar surface adjacent a planar surface of said disc,
   whereby the major planar surfaces of said disc and the planar surfaces of said adjacent capacitor plates may be accurately and precisely aligned in parallel planar relationship to provide a differential capacitor of very accurately predetermined characteristics.

6. Apparatus according to claim 5 wherein said perforations
   are formed as spirals.

7. A unitary accelerometer for measurement of acceleration along a predetermined direction comprising
   a seismic mass,
   said seismic mass having two major surfaces,
   a capacitor plate adjacent each of said surfaces,
   flexure means providing a predetermined spring resistance to motion of said seismic mass along said predetermined direction,
   said flexure means having substantially higher spring resistance to displacement in other directions,
   said seismic mass and capacitor plates serving to provide a differential capacitor,
   whereby changes in the capacitance of said differential capacitor are a function of the displacement of said seismic mass, said differential capacitor having four surfaces,
said surfaces being arranged in facing pairs,
the space between said seismic mass and the capacitor plates being filled with gas,
the resulting film of gas between facing pairs of surfaces serving to provide a predetermined damping ratio as the film of gas is squeezed between the seismic mass and the capacitor plate which it approaches when an acceleration force is applied to the transducer,
the damping being provided by the energy dissipated by the motion of said gas between the seismic mass and the approached capacitor plate,
at least one capacitor plate being provided with at least one hole,
said hole providing an effective cross-section substantially larger than the effective cross-section provided by the spacing between the facing pairs of surfaces through which the film of gas is squeezed,
said larger cross-section providing substantially lower resistance to the passage of the gas than the resistance presented by the path between facing pairs of surfaces,
said hole serving to reduce the length of the path over which gas travels as said seismic mass approaches the adjacent capacitor plate,
said reduced path serving to reduce the elastic effect of compressed gas which would otherwise be provided by said film of gas,
said reduced elastic effect permitting operation at higher frequencies without degraded performance due to the spring effect of compressed gas,
and said reduced path serving to reduce the viscous damping caused by motion of said film of gas between said diaphragm and the adjacent capacitor plate,
whereby the effect of damping ratio is maintained constant over an extended useful high-frequency range,
and whereby said damping ratio is maintained at a desired damping ratio as the gas is squeezed between the seismic mass and the capacitor plate toward which the seismic mass is deflected by an applied acceleration force.

8. Apparatus according to claim 7 wherein at least one of said capacitor plates is provided with a plurality of holes,
the number of holes being chosen to reduce the length of the paths over which the gas travels as said seismic mass approaches the adjacent capacitor plate,
said reduced paths serving to reduce the elastic effect of the compressed gas which would otherwise be provided by said film of gas,
said reduced elastic effect permitting operation at very high frequencies without degraded performance due to the spring effect of compressed gas,
and said reduced paths serving to reduce the viscous damping caused by motion of said film of gas between said diaphragm and the adjacent capacitor plate until it reaches the nearest hole,
whereby the effective damping ratio is maintained constant over an extended useful high frequency range,
and whereby said damping ratio is maintained at a desired damping ratio as the gas is squeezed between the seismic mass and the capacitor plate toward which the seismic mass is deflected by an applied acceleration force.

9. A unitary accelerometer for measurement of acceleration along a predetermined direction comprising a seismic mass,
said seismic mass having two major surfaces,
a capacitor plate adjacent each of said surfaces,
flexure means providing a predetermined spring resistance to motion of said seismic mass along said predetermined direction,
said flexure means having substantially higher spring resistance to displacement in other directions,
said seismic mass and capacitor plates serving to provide a differential capacitor,
whereby changes in the capacitance of said differential capacitor are a function of the displacement of said seismic mass,
said differential capacitor having four surfaces,
said surfaces being arranged in facing pairs,
the space between said seismic mass and the capacitor plates being filled with gas,
the resulting film of gas between facing pairs of surfaces serving to provide a predetermined damping ratio as the film of gas is squeezed between the seismic mass and the capacitor plate which it approaches when an acceleration force is applied to the transducer,
the damping being provided by the energy dissipated by the motion of said gas between the seismic mass and the approached capacitor plate,
said seismic mass being provided with at least one hole,
said hole providing an effective cross-section substantially larger than the effective cross-section provided by the spacing between the facing pairs of surfaces through which the film of gas is squeezed,
said larger cross-section providing substantially lower resistance to the passage of the gas than the resistance presented by the path between facing pairs of surfaces,
said hole serving to reduce the length of the path over which gas travels as said seismic mass approaches the adjacent capacitor plate,
said reduced path serving to reduce the elastic effect of compressed gas which would otherwise be provided by said film of gas,
said reduced elastic effect permitting operation at higher frequencies without degraded performance due to the spring effect of compressed gas,
and said reduced path serving to reduce the viscous damping caused by motion of said film of gas between said diaphragm and the adjacent capacitor plate,
whereby the effect of damping ratio is matintained constant over an extended useful high-frequency range,
and whereby said damping ratio is maintained at a desired damping ratio as the gas is squeezed between the seismic mass and the capacitor plate toward which the seismic mass is deflected by an applied acceleration force.

10. A unitary accelerometer for measurement of acceleration along a predetermined direction comprising
a seismic mass,
said seismic mass having two major surfaces,
a capacitor plate adjacent each of said surfaces,
flexure means providing a predetermined spring resistance to motion of said seismic mass along said predetermined direction,
said flexure means having substantially higher spring resistance to displacement in other directions,
said seismic mass and capacitor plates serving to provide a differential capacitor,
whereby changes in the capacitance of said differential capacitor are a function of the displacement of said seismic mass,
said differential capacitor having four surfaces,
said surfaces being arranged in facing pairs,
the space between said seismic mass and the capacitor plates being filled with gas,
the resulting film of gas between facing pairs of surfaces serving to provide a predetermined damping ratio as the film of gas is squeezed between the seismic mass and the capacitor plate which it approaches when an acceleration force is applied to the transducer,
the damping being provided by the energy dissipated by the motion of said gas between the seismic mass and the approached capacitor plate,
said seismic mass being formed as a thin diaphragm,
said diaphragm being secured to a casing around the perimeter,
the energy dissipated as said gas moves between said diaphragm and the approached capacitor plates serving to provide damping,
and said diaphragm serving as the spring restraint to motion of the seismic mass,
said diaphragm containing at least one hole,
said hole providing an effective cross-section substantially larger than the effective cross-section provided by the spacing between the facing pairs of surfaces through which the film of gas is squeezed,
said larger cross-section providing substantially lower resistance to the passage of the gas than the resistance presented by the path between facing pairs of surfaces,
said hole serving to reduce the length of the path over which said gas travels as said diaphragm approaches the adjacent capacitor plate,
said reduced path serving to reduce the elastic effect of compressed gas which would otherwise be provided by said film of gas,
said reduced elastic effect permitting operation at higher frequencies without degraded performance due to the spring effect of compressed gas,
and said reduced path serving to reduce the viscous damping caused by motion of said film of gas between said diaphragm and the adjacent capacitor plate,
whereby the effective damping ratio is maintained substantially constant over an extended useful frequency range,
and whereby said damping ratio is maintained at a desired damping ratio as the gas is squeezed between the seismic mass and the capacitor plate toward which the seismic mass is deflected by an applied acceleration force.

11. A unitary accelerometer for measurement of acceleration along a predetermined direction comprising
a seismic mass,
said seismic mass having two major surfaces,
a capacitor plate adjacent each of said surfaces,
flexure means providing a predetermined spring resistance to motion of said seismic mass along said predetermined direction,
said flexure means having substantially higher spring resistance to displacement in other directions,
said seismic mass and capacitor plates serving to provide a differential capacitor,
whereby changes in the capacitance of said differential capacitor are a function of the displacement of said seismic mass,
said differential capacitor having four surfaces,
said surfaces being arranged in facing pairs,
and the space between said seismic mass and the capacitor plates being filled with gas,
the resulting film of gas between facing pairs of surfaces serving to provide a predetermined damping ratio as the film of gas is squeezed between the seismic mass and the capacitor plate which it approaches when an acceleration force is applied to the transducer,
the damping being provided by the energy dissipated by the motion of said gas between the seismic mass and the approached capacitor plate,
said seismic mass including a central body,
said central body having two major planar surfaces,
said planar surfaces being parallel to and equidistant from each other,
two discs of material,
each of said discs having two major parallel planar surfaces,
one of said discs being affixed to each major planar surface of said central body,
the central portions of said disc and said body serving as a seismic mass,
a casing,
the outer portions of said discs being affixed to the casing,
and the portions of said discs between said central body and the casing serving to provide the supporting flexure means,
the surface of the central portions of said discs not affixed to said central body serving as capacitor plates,
said uniform planar central body and discs serving to permit extremely accurate alignment of said seismic mass in parallel planar relationship with adjacent planar capacitor plates in a casing,
whereby transducer characteristics of extreme accuracy and predetermined characteristics may be obtained.

12. Apparatus according to claim 11 wherein said central portion of each of said discs
is surrounded by an area containing perforations,
said perforations serving to reduce stiffness,
said areas of reduced stiffness serving to provide the supporting flexure means.

* * * * *